Figure 1:
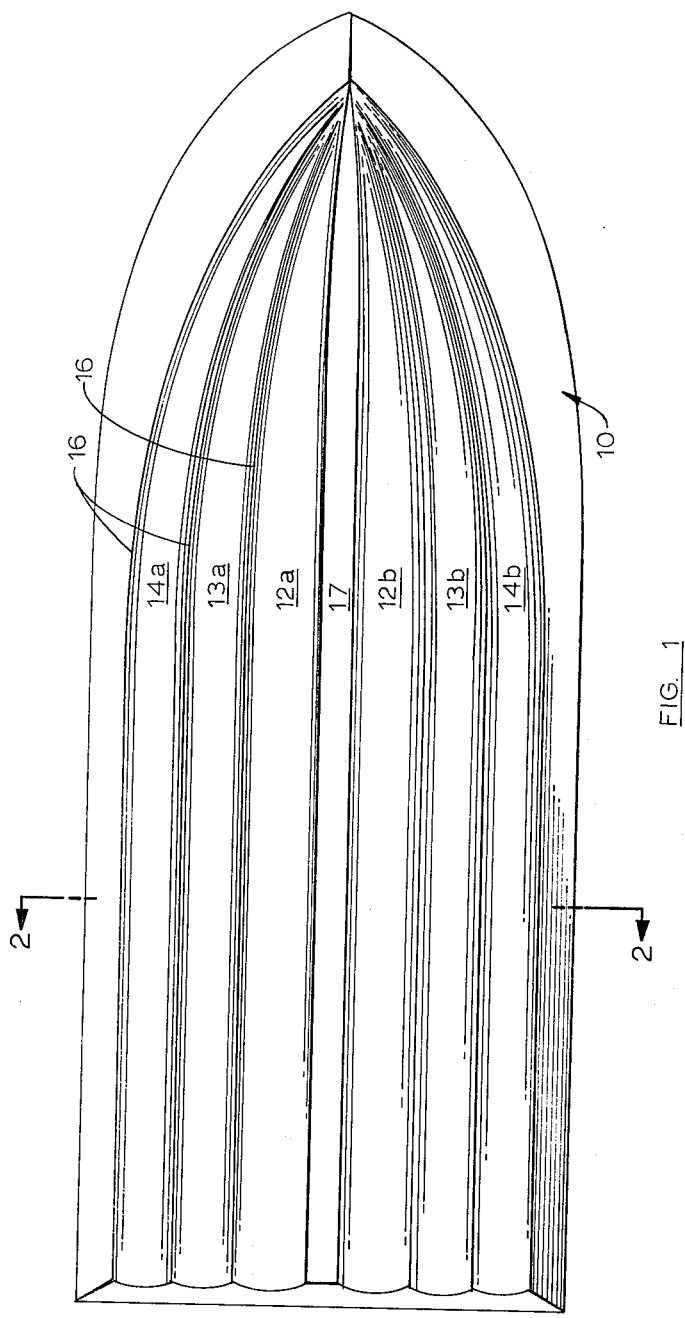

Nov. 9, 1965  O. I. THORSEN  3,216,389
BOAT HULL

Filed Jan. 20, 1964  3 Sheets-Sheet 2

INVENTOR.
OLE I. THORSEN
BY
ATTORNEY

Nov. 9, 1965

O. I. THORSEN 3,216,389

BOAT HULL

Filed Jan. 20, 1964

3 Sheets-Sheet 3

INVENTOR.
OLE I. THORSEN
BY
ATTORNEY

United States Patent Office 3,216,389
Patented Nov. 9, 1965

3,216,389
BOAT HULL
Ole I. Thorsen, 20635 Deforest St.,
Woodland Hills, Calif.
Filed Jan. 20, 1964, Ser. No. 338,700
10 Claims. (Cl. 114—56)

This invention relates to a boat hull and more particularly to a planing hull configuration capable of stable operation at very high speeds and in which spray is substantially eliminated even at such high speeds.

Planing type hulls are used extensively in pleasure speed boats and naval patrol craft. In such vessels, it is desirable that the vessel have a narrower effective beam at high speeds and a wider beam at low speeds for proper stability. Empirical data indicates that optimum stability can be achieved at all speeds if the beam is effectively decreased as a function of the speed of the vessel in accordance with the following formula:

$$b = \sqrt{\frac{D}{v^2 K}} \quad (1)$$

where,
$b$ = beam width
$v$ = velocity of vessel
$D$ = displacement of vessel
$K$ = .025 for maximum efficiency It is also desirable, for minimum drag, to maintain the angle of attack of the vessel constant at a predetermined optimum value once the minimum drag speed for planing operation has been reached.

Efforts have been made in boat hull configurations of the prior art to optimize stability by the utilization of a plurality of chines extending longitudinally along the boat hull, such chines being separated by planing surfaces. Under relatively rough water conditions, however, none of these configurations have been capable of adequately decreasing the effective beam as a function of the speed of the vessel or of maintaining the angle of attack substantially constant with changes in speed. Consequently, none of these prior art hull configurations have been capable of approaching the ideal high stability and low drag conditions necessary for proper high speed operation under normally encountered open water conditions.

The device of this invention provides means for overcoming the shortcomings of prior art devices in a boat hull configuration in which the effective beam is decreased as a function of the speed of the vessel even under normally encountered sea state conditions. At the same time, the angle of attack of the vessel is maintained substantially constant at a predesired value above the minimum drag speed for planing operation. Along with the minimal drag and excellent stability attained at high speeds, the spray generated by the boat is substantially eliminated, thus further making for a comfortable ride. With the stability achieved by means of the device of the invention, shock loads which normally occur at high speeds in boats of the prior art, are substantially reduced, and the overall efficiency of the vessel is increased to make it possible to achieve much higher speeds with any given power system.

Such improved operation is achieved in the device of the invention by utilizing a boat hull configuration which is generally V-shaped and includes a plurality of curved longitudinally extending planing surfaces which are separated by chines. These curved surfaces have smooth contours with a substantially greater curvature on the top ends than the bottom ends thereof. The hull has a generally monohedron shape from approximately midship to the stern. The chines and planing surfaces run all the way from the bow to the stern of the vessel and form a plurality of water channels that extend substantially the entire length of the hull. The chines from midship aft run substantially parallel, both horizontally and vertically, to the keel.

The planing surfaces have a relatively low entry angle (at the lower edge) and a relatively high exit angle (at the upper edge) which results in an efficient lifting surface for raising the boat out of the water as the speed increases, with minimum turbulence at the chines. The high exit angle causes the water to be thrust downward and rearward thereby minimizing the water spray. The device of this invention by virtue of the planing surfaces on each side of the hull extending from approximately the bow to the stern thereof causes the vessel to be automatically lifted out of the water as the speed increases to effectively decrease the beam. Such lifting action raises the hull so as to maintain the angle of attack relatively constant once the minimum planing drag speed has been attained.

It is therefore an object of this invention to provide a boat hull configuration capable of stable operation with minimal drag and spray at very high speeds.

It is still another object of this invention to provide a boat hull capable of maintaining a constant angle of attack for all speeds above the minimal drag speed for planing operation.

It is still another object of this invention to provide simple but effective means for lifting a boat hull out of the water as a function of the speed thereof.

It is still another object of this invention to improve the stability of boats at high speeds.

Figure 2:
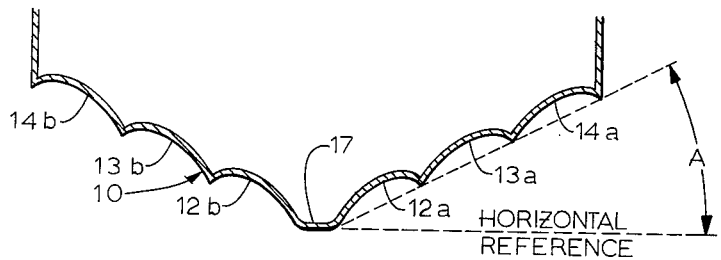
Figure 5:
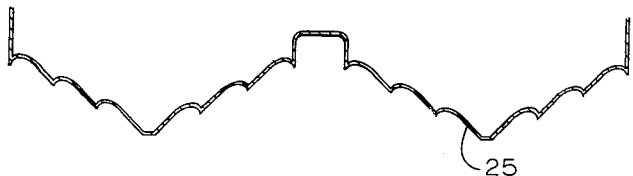
Figure 6:
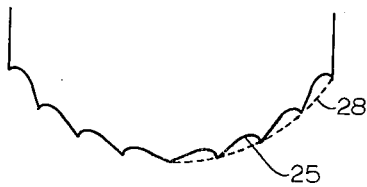
Figure 7:
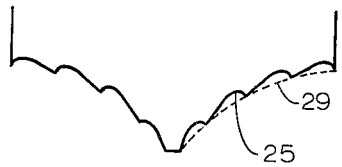
Figure 3:
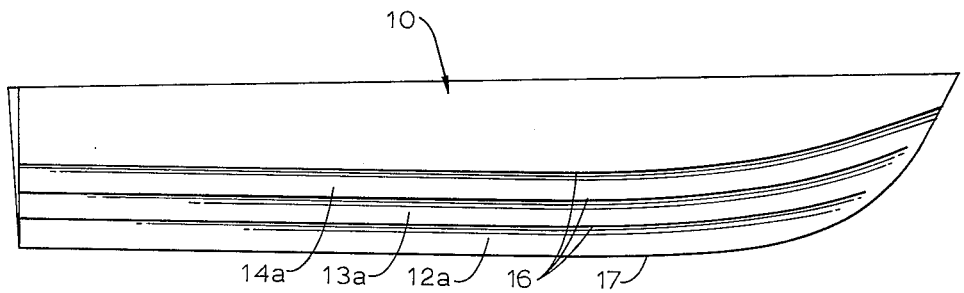
Figure 4:
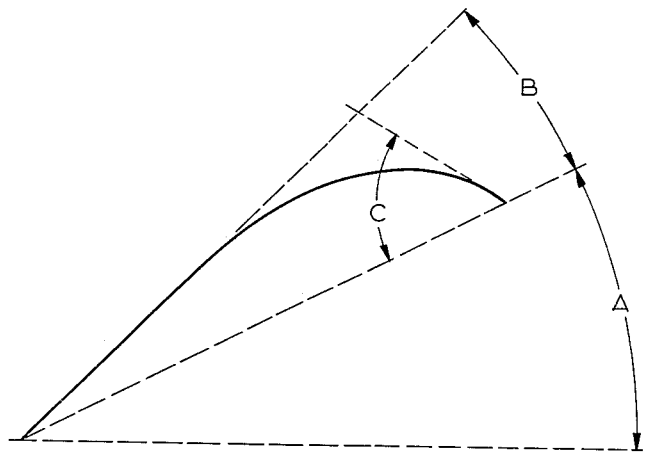

Other objects of this invention will become apparent from the following description taken in connection with the accompanying drawings of which FIG. 1 is a plan view illustrating a preferred embodiment of the device of the invention, FIG. 2 is a cross sectional view of the embodiment shown in FIG. 1 as taken along the plane indicated by the line 2—2 in FIG. 1, FIG. 3 is an elevation view of the preferred embodiment of the device of the invention, FIG. 4 is a schematic diagram illustrating the details of the planing surfaces utilized in the device of the invention, FIG. 5 is a cross sectional view illustrating a second embodiment of the device of the invention as incorporated into a catamaran hull, FIG. 6 is a cross sectional view illustrating a third embodiment of the device of the invention as incorporated into a hull having a convex dead rise, and FIG. 7 is a cross sectional view of a fourth embodiment of the device of the invention as incorporated into a boat hull having a concave dead rise.

Referring now to FIGS. 1–4, a preferred embodiment of the device of the invention is illustrated. The bottom of the boat hull 10 is divided into a plurality of curved planing surfaces 12a–14a and 12b–14b which have a smooth continuous curvature. These planing surfaces are separated from each other by chines 16 which preferably have sharp edges. The chines and planing surfaces extend substantially from the bow to the stern of the hull. From approximately midship to the stern, the hull is substantially monohedron, the chines and planing surfaces having a substantially constant cross section with the chines and planing surfaces running along axes substantially parallel, both vertically and horizontally, to keel 17. The boat hull has a flat keel 17 and a dead rise angle A which is relatively steep. The planing sections 12a–14a and 12b–14b have relatively low entry angles B, the entry angle of any planing surface being defined as the angle formed between the tangent to the bottom end of that planing surface and the dead rise (see FIG. 4). Planing surfaces 12b–14b are substantially identical in their configuration to surfaces 12a–14a.

Planing surfaces 12a, 12b; 13a, 13b; and 14a, 14b have exit angles C, the exit angle of any planing surface being defined as the angle formed between the tangent to the top end of that planing surface and the dead rise (see FIG. 4). Exit angles C are substantially greater than entry angles B and are located at the ends of the planing surfaces having the greater curvature. The use of such relatively low entry angles and such relatively high exit angles substantially increases the lift provided without an increase in the turbulence produced by water flowing across the corners of the chines by causing the water to be thrust downward and rearward in a positive fashion. This high downward thrust substantially increases the lift which makes the hull rise rapidly out of the water as the speed is increased. For optimum results, it is desirable to make the exit angles on the lower planing surfaces, on which the hull rides at higher speeds, greater than those for the upper planing surfaces utilized at lower speeds.

Experimentation with an operative embodiment of the device of the invention indicates that excellent results can be achieved with an entry angle B of 18° for each of the planing sections, a dead rise angle A of 27°, and exit angles C of 57°, 52°, and 47° for planing surfaces 12a, 12b; 13a, 13b; and 14a, 14b respectively.

The device of the invention operates as follows:

When the vessel initially starts to move in the water, the water line is up near the top or exit angle portion of planing sections 14a and 14b. With the boat in motion, the water is thrust downward by all of the planing surfaces and the water stream is channeled along these surfaces toward the stern of the boat. As the speed is increased the lift produced all along the planing surfaces causes the hull to rise out of the water along its entire length. As the speed continues to increase, the hull finally rises until planing surfaces 14a and 14b are entirely out of the water and the planing action is taken over by the remaining planing surfaces. With still further increases in speed, the hull finally is supported on planing surfaces 12a and 12b alone. The use of three or four planing surfaces on each side of the hull in the ordinary type boat hull has been found to operate quite satisfactorily. More than this number of planing surfaces may be utilized, however, where application demands so dictate. The only limitation along these lines is that there not be so many planing surfaces as to substantially increase turbulence losses.

Chines 16, as already noted, run all the way from the bow to the stern of the craft and, for maximum efficiency, should be substantially parallel to the center line of the keel from approximately midship aft to the transom 20.

Referring now to FIG. 5, a cross sectional view showing the device of the invention as incorporated into a catamaran is shown. In the embodiment illustrated in FIG. 3, a plurality of curved planing surfaces 25 are utilized to form succeeding lifting surfaces as the speed of the vessel increases. Operation is similar to the operation described in connection with the embodiment of FIGS. 1, 2, and 3.

Referring now to FIGS. 6 and 7, embodiments of the device of the invention with a convex and a concave dead rise respectively are shown. As shown in FIG. 6, the curved planing surfaces 25 which are similar in configuration to those illustrated in connection with the other embodiments are arranged to form a convexly shaped dead rise 28. In the embodiment illustrated in FIG. 7, curved shaped planing surfaces 25 are arranged to produce a concave dead rise 29.

The embodiments illustrated in FIGS. 5–7 merely show several ways in which the device of the invention can be adapted for particular applications. Other adaptations may readily be made of the basic configuration illustrated in FIGS. 1, 2, and 3 to fit a multitude of other application requirements as the situation might demand.

Experimentation indicates that optimum results are achieved with three or four planing surfaces, the hull having a dead rise angle of approximately 27° plus or minus 3°. Planing surfaces each having an entry angle relative to dead rise of approximately 18° plus or minus 3° and an exit angle relative to the dead rise of 57° plus or minus 8° in the monohedron section of the hull are found to give high performance in rough water at high speeds.

The device of this invention thus provides a simple yet highly effective means for substantially improving the stability of boats at high speed and minimizing the drag incidental to such high speed operation.

While the invention has been described and illustrated in detail, it is to be clearly understood that this is intended by way of illustration and example only and is not to be taken by way of limitation, the spirit and scope of this invention being limited only by the terms of the following claims.

I claim:
1. A boat hull having a bottom portion with the general shape of a V, said bottom portion including
    a plurality of pairs of longitudinal planing surfaces, said planing surfaces having a smooth, continuous concave curvature and being arranged in symmetrical pairs opposite each other to form the legs of said V and extending substantially from the bow to the transom of said boat hull,
    a substantially flat keel, and
    a plurality of edge portions forming chines separating said planing surfaces,
    said chines and said planing surfaces running along axes substantially parallel to the longitudinal axis of said keel from at least the midship point on said hull to the transom thereof to give said hull a monohedron shape,
    the legs of said V defining the hull dead rise, the bottom ends of said planing surfaces forming entry angles with said dead rise which are relatively small, the top ends of said planing surfaces forming exit angles with said dead rise which are relatively large as compared with said entry angles, said planing surfaces forming downwardly thrusting water scoops.
2. A boat hull having a bottom portion with the general shape of a V, said bottom portion including
    a plurality of pairs of continuously and smoothly concavely curved longitudinal planing surfaces, said planing surfaces being arranged in symmetrical pairs opposite each other to form the legs of said V and extending substantially from the bow to the transom of said boat hull,
    a substantially flat keel, and
    a plurality of edge portions forming chines separating said planing surfaces,
    the legs of said V forming a relatively high hull dead rise, the bottom ends of said planing surfaces running upward to form entry angles with said dead rise which are relatively small, the top ends of said planing surfaces running downward to form exit angles with said dead rise which are substantially larger than said entry angles, said planing surfaces forming downwardly thrusting water scoops.
3. The hull as recited in claim 2 wherein said chines are substantially parallel to the longitudinal axis of the keel from the midship point to the transom thereof.
4. The hull as recited in claim 2 wherein said bottom portion has a substantially constant cross section from midship to the transom of said hull.
5. In a boat hull,
    a generally V-shaped bottom portion including
    a flat keel defining a horizontal reference plane,
    a plurality of symmetrically arranged pairs of longitudinally extending concave planing surfaces forming the legs of said V, said planing surfaces extending substantially from the bow to the transom of said hull, the vertex angle of said V defining the dead rise of said hull, longitudinally extending edge portions forming chines separating said planing surfaces from each other, said chines running along axes substantially parallel to the longitudinal axis of said keel from at least the midship point on said hull to the transom thereof, said planing surfaces having a contour with a smooth continuous curvature, the top ends of said surfaces having a greater curvature than the bottom ends thereof and running downward to form relatively high exit angles with the plane of said dead rise, the bottom ends of said surfaces running upward to form relatively low entry angles with the plane of said dead rise, thereby forming downwardly thrusting water scoops, whereby said hull is lifted substantially uniformly out of the water as the speed thereof increases above the minimum drag speed for planing action.

6. The boat hull as recited in claim 5 wherein said entry angles are between 13 and 23 degrees.

7. In a boat hull, a generally V-shaped bottom portion including a keel defining a horizontal reference plane, a plurality of symmetrically arranged pairs of longitudinally extending concave planing surfaces forming the legs of said V, said planing surfaces extending substantially from the bow to the transom of said hull, the vertex angle of said V defining the dead rise of said hull, longitudinally extending edge portions forming chines separating said planing surfaces from each other, said bottom portion having a substantially constant cross section from at least the midship point on said hull to the transom thereof to give said hull a monohedron shape, said planing surfaces having a contour with a smooth continuous curvature, the top ends of said surfaces having a greater curvature than the bottom ends thereof and running downward to form relatively high exit angles with the plane of said dead rise, the bottom ends of said surfaces running upward to form relatively low entry angles with the plane of said dead rise, thereby forming downwardly thrusting water scoops, whereby said hull is lifted substantially uniformly out of the water as the speed thereof increases above the minimum drag speed for planing action.

8. In a boat hull, means for improving the stability of the high speed operation thereof comprising a generally V-shaped hull bottom, the vertex of said V defining the hull dead rise, said bottom comprising a plurality of longitudinally extending pairs of concave planing surfaces, the profile contour of each of said surfaces being in the shape of a smooth, continuous curve, said surfaces each running without interruption from the bow portion of said hull to the transom thereof, said hull further having relatively sharp longitudinal edge portions forming chines separating said planing surfaces from each other, said hull still further having a substantially flat keel portion, said chines and said planing surfaces having a substantially constant cross section from a point approximately midships on said hull to the transom thereof with said chines and said planing surfaces running along axes substantially parallel both vertically and horizontally to said keel to give said hull a monohedron shape, the top ends of said planing surfaces having a substantially greater curvature than the bottom ends thereof, thereby forming downwardly thrusting water scoops.

9. The hull as recited in claim 8 wherein the bottom end of each of said planing surfaces runs upward along an axis forming a relatively low angle with the dead rise of said hull and the top end of each of said planing surfaces runs downward along an axis forming a relatively high angle with the dead rise.

10. A generally V-shaped hull bottom, the vertex angle of said V defining the dead rise of said hull bottom, said bottom comprising a plurality of longitudinally extending pairs of concave planing surfaces, the profile contour of each of said surfaces being in the shape of a smooth, continuous curve, said surfaces each running without interruption from the bow portion of said hull to the transom thereof to form downwardly thrusting water scoops, said hull further having longitudinal edge portions forming chines separating said planing surfaces from each other, said chines and said planing surfaces having a substantially constant cross section from a point approximately midships on said hull to the transom thereof, the top ends of said planing surfaces having a substantially greater curvature than the bottom ends thereof and running in a downward direction along an axis forming an exit angle with said dead rise, the bottom ends of said planing surfaces running in an upward direction along an axis forming an entry angle with said dead rise, said exit angle being substantially greater than said entry angle.

References Cited by the Examiner

UNITED STATES PATENTS

| | | | |
|---|---|---|---|
| 1,296,155 | 3/19 | Bazaine | 114—66.5 |
| 1,726,439 | 8/29 | Kroukovsky | 114—66.5 |
| 2,887,978 | 5/59 | Tritt. | |
| 3,040,687 | 6/62 | Huet | 114—56 |
| 3,117,544 | 1/64 | Schoell | 9—6 |
| 3,126,856 | 3/64 | Fuller | 114—66.5 |
| 3,135,976 | 6/64 | Winters | 9—6 |

FOREIGN PATENTS 317,054    4/30    Great Britain.

FERGUS S. MIDDLETON, *Primary Examiner.*